(12) United States Patent
Tanielian

(10) Patent No.: US 11,079,616 B2
(45) Date of Patent: Aug. 3, 2021

(54) NANOSTRUCTURE-BASED OPTICAL LIMITERS FOR FACILITATING APERTURE PROTECTION

(71) Applicant: The Boeing Company, Chicago, IL (US)

(72) Inventor: Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 15/715,090

(22) Filed: Sep. 25, 2017

(65) Prior Publication Data

US 2019/0094574 A1 Mar. 28, 2019

(51) Int. Cl.
  *G02F 1/01* (2006.01)
  *B64C 1/14* (2006.01)
  *G02F 1/35* (2006.01)

(52) U.S. Cl.
  CPC .............. *G02F 1/01* (2013.01); *B64C 1/1484* (2013.01); *B64C 1/1492* (2013.01); *G02F 1/3523* (2013.01); *G02F 1/0126* (2013.01)

(58) Field of Classification Search
  CPC ... B64C 1/1492; B64C 1/1494; B64C 1/1484; G02F 1/01; G02F 1/0126; G02F 1/3523
  USPC ............................................. 359/240; 428/38
  See application file for complete search history.

(56) References Cited

U.S. PATENT DOCUMENTS

| 4,968,121 | A * | 11/1990 | Bruesselbach | G02F 1/3501 |
| | | | | 359/240 |
| 10,073,201 | B2 * | 9/2018 | Ma | G02B 5/1885 |
| 10,939,995 | B2 * | 3/2021 | Silvestrini | A61F 2/1659 |
| 10,942,376 | B2 * | 3/2021 | Kante | G01N 21/554 |
| 2012/0037803 | A1 * | 2/2012 | Strickland | H01Q 1/425 |
| | | | | 250/338.1 |
| 2015/0321606 | A1 * | 11/2015 | Vartanian | G02B 27/0101 |
| | | | | 348/148 |
| 2019/0331943 | A1 * | 10/2019 | Hupperich | B64C 1/1492 |

OTHER PUBLICATIONS

Ward et al., (Laser-induced nucleation of carbon dioxide bubbles, The Journal of Chemical Physics, 142, 144501 (2015)) (Year: 2015).*

(Continued)

*Primary Examiner* — William R Alexander
*Assistant Examiner* — Tamara Y. Washington
(74) *Attorney, Agent, or Firm* — Haynes and Boone, LLP

(57) ABSTRACT

Various techniques provide nanostructure-based optical limiters for facilitating aperture protection. In one example, a method includes receiving, via a first window, incident light on a solution, where the solution includes liquid medium, a gas dissolved in the liquid medium, and nanostructures in contact with the liquid medium. The method further includes generating heat in the liquid medium based on oscillations of a subset of the plurality of nanostructures in response to the incident light. The method further includes releasing at least a portion of the gas from the solution as gas bubbles in response to the generated heat. The method further includes scattering, by the released gas bubbles, the incident light to prevent the incident light from reaching a second window. Related systems and products are also provided.

20 Claims, 5 Drawing Sheets

(56) References Cited

OTHER PUBLICATIONS

Mitsunaga et al., (Intercalated Polycarbonate/Clay Nanocomposites: Nanostructure Control and Foam Processing, Macromolecular Materials and Engineering, 288, 543-548 (2003)) (Year: 2003).*

Lachaine et al. "Computational Design of Durable Spherical Nanoparticles with Optimal Material, Shape, and Size for Ultrafast Plasmon-Enhanced Nanocavitation", ACS Photonics, Oct. 11, 2016, pp. 2158-2169, ACS Publications.

Hogan et al. "Nanoparticles Heat Through Light Localization", Nano Letters, Jun. 24, 2014, pp. 4640-4645, ACS Publications.

Neumann et al. "Nanoparticle-Mediated, Light-Induced Phase Separations", Nano Letters, Nov. 4, 2015, pp. 7880-7885, ACS Publications.

Nguyen et al. "Photothermal Release of CO2 from Capture Solutions using Nanoparticles", Energy Environ. Sci., 2014, pp. 2603-2607, Royal Society of Chemistry.

Jin et al, "Steam Generation in a Nanoparticle-Based Solar Receiver", Nano Energy, 2016, pp. 397-406, Elsevier.

Baffou et al. "Super-Heating and Micro-Bubble Generation Around Plasmonic Nanoparticles Under CW Illumination", The Journal of Physical Chemistry, Jan. 8, 2014, pp. 4890-4898, ACS Publications.

Belousova et al., "Nonlinear Optical Limiters of Pulsed Laser Radiation Based on Carbon-Containing Nanostructures in Viscous and Solid Matrices", Polymers for Advanced Technologies, Jun. 9, 2014, pp. 1008-1013, vol. 25, No. 9.

Hagan et al., "Optical Limiting Via Nonlinear Scattering with Solgel Host Materials", SPIE Conference on Power-Limiting Materials and Devices, Jul. 1999, pp. 17-21, vol. 3798.

Metwally et al., "Fluence Threshold for Photothermal Bubble Generation Using Plasmonic Nanoparticles", The Journal of Physical Chemistry, Dec. 11, 2015, pp. 28586-28596, vol. 119, No. 51.

Singh et al., "Investigation of Optical Limiting in Iron Oxide Nanoparticles", Optics Express, Jun. 9, 2008, pp. 8440-8450, vol. 16, No. 12.

Wang et al., "Vapor and Gas-Bubble Growth Dynamics Around Laser-Irradiated, Water-Immersed Plasmonic Nanoparticles", ACS Nano, Jan. 16, 2017, pp. 2045-2051, vol. 11, No. 2.

Ward et al., "Laser-Induced Nucleation of Carbon Dioxide Bubbles", The Journal of Chemical Physics, Apr. 8, 2015, 8 Pages, vol. 142, No. 14.

* cited by examiner

NANOSTRUCTURE-BASED OPTICAL LIMITERS FOR FACILITATING APERTURE PROTECTION

BACKGROUND

Technical Field

The present application generally relates to aperture protection and, more specifically, to nanostructure-based optical limiters for facilitating aperture protection.

Related Art

Proliferation of easily obtainable and affordable sources of light, such as laser pointers, has created a threat to apertures such as human eyes and sensors, since such sources of light may be utilized to blind (e.g., temporarily blind) the eyes, and/or damage and/or saturate the sensors. For example, light that is shone through a window of an aircraft vehicle may impact a pilot's ability to navigate the vehicle and may potentially lead to serious consequences.

Unfortunately, many conventional aperture protection techniques are slow to react to incident light and/or require the incident light to be of high irradiance (e.g., in short, high energy pulses) prior to implementing aperture protection. Therefore, there is a need for an improved approach for facilitating aperture protection, such as for low irradiation levels for example.

SUMMARY

In accordance with various embodiments further discussed herein, nanostructure-based optical limiters are provided for facilitating aperture protection from potentially harmful light. In general, whether incident light is considered to be potentially harmful is application specific and may be based on a frequency and an irradiance associated with the light. In some embodiments, an optical limiter device may include a solution with a liquid medium, a gas dissolved in the liquid medium, and nanostructures distributed in (e.g., colloidally distributed in) the liquid medium. Alternatively and/or in addition, in another embodiment, the nanostructures may be formed on a surface (e.g., an inner surface/side) of a window of the optical limiter device, such that the nanostructures on the surface are in contact with the liquid medium.

In response to light that is potentially harmful, the nanostructures illuminated by the light may absorb the light, transduce the absorbed light into heat, and transfer such heat to the liquid medium to cause the gas to release as gas bubbles (e.g., also referred to as nanobubbles) from the liquid medium. The heat transfer from the nanostructures to the liquid medium is local in nature and causes the gas bubbles to form in a vicinity of the liquid medium's volume that surrounds the nanostructures illuminated by the light. The gas bubbles scatter the potentially harmful light such that the light does not reach an aperture, while allowing other light (e.g., light considered to not be potentially harmful) propagating through portions of the optical limiter device unobstructed by the gas bubbles to pass through the optical limiter device and to the aperture. When the potentially harmful light is removed, the gas dissolves back into the liquid medium.

In some embodiments, the optical limiter device provides high speed response to potentially harmful light, quick recovery from the potentially harmful light, and transparency for light that is not potentially harmful. In some cases, dependent on application, the optical limiter device may be configured to provide high sensitivity to light to allow light at lower irradiance levels (e.g., also referred to as lower illumination levels in some cases) to cause the gas to be released as gas bubbles to scatter the light.

According to an embodiment, a method may include receiving, via a first window, incident light on a solution. The solution may include a liquid medium, a gas dissolved in the liquid medium, and a plurality of nanostructures in contact with the liquid medium. The plurality of nanostructures in contact with the liquid medium may include nanostructures distributed in the liquid medium and/or nanostructures resident on a surface (e.g., inner surface) of the first window in contact with the liquid medium. The method may further include generating heat in the liquid medium based on oscillations of a subset of the plurality of nanostructures in response to the incident light. The method may further include releasing at least a portion of the gas from the solution as gas bubbles in response to the generated heat. The method may further include scattering, by the released gas bubbles, the incident light to prevent the incident light from reaching a second window.

According to another embodiment, a system may include an optical device. The optical device may include a first window configured to pass incident light. The optical device may further include a second window. The optical device may further include a solution between the first window and the second window. The solution may include a liquid medium. The solution may further include a plurality of nanostructures in contact with the liquid medium. The plurality of nanostructures may be dispersed in the liquid medium or on a surface (e.g., inner surface) of the first window and in contact with the liquid medium that is between the two windows. At least a subset of the plurality of nanostructures is configured to generate heat by absorption of the incident light via one or more physical mechanisms. The solution may further include a gas dissolved in the liquid medium. At least a portion of the gas is configured to release from the liquid medium as gas bubbles in an immediate vicinity of the subset of nanostructures in response to the generated heat. The released gas bubbles are configured to scatter the incident light to prevent the incident light from reaching the second window.

According to another embodiment, a method of making the system may include forming the solution. The forming may include dissolving the gas in the liquid medium and providing the plurality of nanostructures in contact with the liquid medium. The plurality of nanostructures may be provided by distributing nanostructures in the liquid medium and/or forming nanostructures on a surface (e.g., inner surface) of the first window. The method may further include providing the solution between the first and second window. The method may further include sealing the first window to the second window, such as in a hermetic manner. The method may further include engaging the first window and second window with one or more engagement elements configured to receive the optical device.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
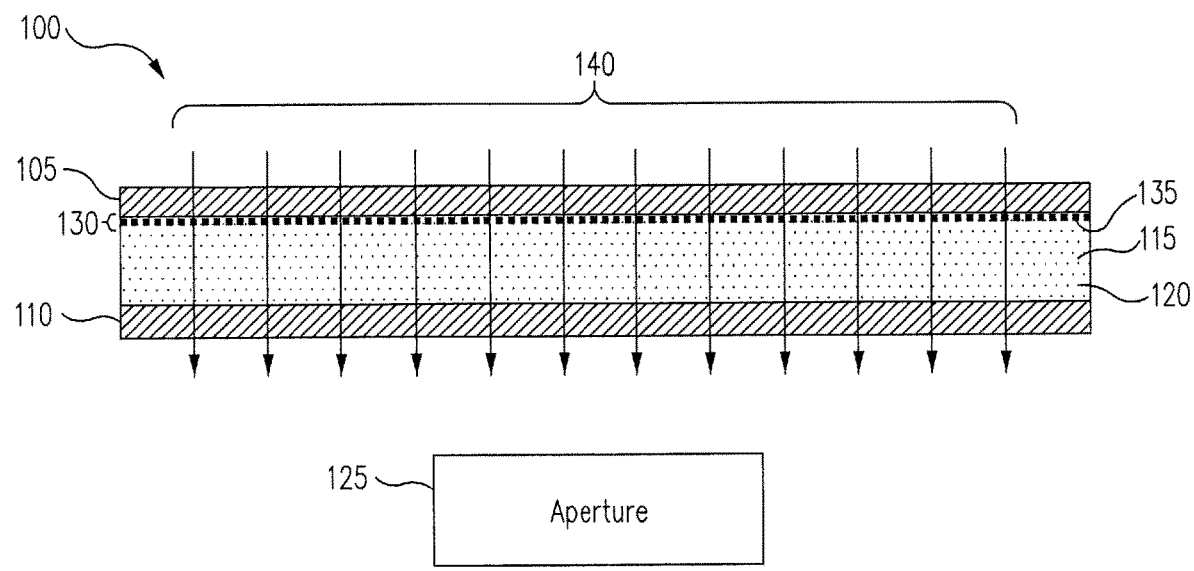
FIG. 1 illustrates an optical limiter device for facilitating aperture protection in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. It is noted that sizes of various components and distances between these components are not drawn to scale in the drawings. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate aperture protection. In some embodiments, to facilitate aperture protection, an optical limiter device may be provided to protect one or more apertures from potentially harmful light. In some cases, the optical limiter device may be implemented (e.g., positioned) in front of an aperture to prevent the potentially harmful light from reaching the aperture while allowing other light to pass through and reach the aperture. For example, apertures may include human eyes and/or sensors. Absent the optical limiter device, the potentially harmful light may blind the eyes, and/or damage and/or saturate the sensors. The optical limiter device may be provided in a vehicle (e.g., terrestrial, naval, aerial, and/or space vehicles), sensors (e.g., radar system), wearable device (e.g., glasses, goggles), and/or generally in any system in which aperture protection may be implemented. As an example, the optical limiter device may be provided as a window of the vehicle to selectively pass light into the vehicle. The optical limiter device may be utilized to protect pilots and/or optical equipment against incident light, which may be aimed at the pilots and/or optical equipment (e.g., such as in a laser attack).

The optical limiter device may include a first and second window with a solution dispersed between the windows. The solution may include a liquid medium (e.g., also referred to as a liquid matrix), a gas dissolved in the liquid medium, and nanostructures in contact with the liquid medium. The nanostructures may include nanostructures distributed (e.g., colloidally distributed) in the liquid medium and/or nanostructures located on a surface (e.g., inner surface) of the first window of the optical limiter device. Gas bubbles (e.g., also referred to as foam) may form in portions of the solution illuminated by potentially harmful light such that the light is prevented from reaching the aperture. Thus, portions of the optical limiting device illuminated by the potentially harmful light effectively turn opaque in response to the light, whereas portions of the limiter device absent any potentially harmful light remain transparent. In some cases, opacity scales with the irradiance of the light, such that the optical limiting device provides higher opacity in response to light of higher irradiance. In an aspect, the nanostructures may include electrically conductive material.

To form the gas bubbles, the solution of the optical limiter device may follow a sequence of reactions. In some aspects, nanostructures illuminated by potentially harmful light may absorb the light and convert the absorbed light into heat, thus raising the temperature of the nanostructures. The nanostructures illuminated by the potentially harmful light may be in contact with the liquid medium, and may include nanostructures distributed in the liquid medium and/or disposed on the surface of the first window of the optical limiter device. In this regard, the heat is generated in response to the incident light. The rise in temperature of the nanostructures may cause heating in a portion of the liquid medium local to the nanostructures. The localized heating of the liquid medium may cause gas dissolved in the liquid medium to be released (e.g., gas comes out of solution) as gas bubbles around the heated nanostructures.

The gas bubbles formed from the localized heating may scatter the potentially harmful light. The scattering of the potentially harmful light may be performed without evaporating the liquid medium, which may take a longer duration of time than having the gas released as gas bubbles from the liquid medium. In some cases, small changes in the temperature of the liquid medium can cause the gas to be released from the liquid medium and scatter the potentially harmful light, thus facilitating faster response time to the potentially harmful light at lower illumination levels (e.g., irradiance levels). In these cases, the optical limiter device may be referred to as having high sensitivity, since even light at lower illumination levels may be sufficient to cause the small change in the liquid medium's temperature and thus cause the gas to be released as gas bubbles to scatter the light. The reactions that occur to form the gas bubbles may be reversible. In this regard, when the potentially harmful light is removed (and absent any additional potentially harmful light), the liquid medium reverts to its original temperature (e.g., temperature prior to the localized heating) and the gas dissolves back into the liquid medium (e.g., gas goes back into solution).

In some aspects, potentially harmful light may refer to light having a certain frequency and having an irradiance above a threshold value. The frequency and threshold irradiance value may be application specific. In other words, what is considered potentially harmful light in one application may not be considered potentially harmful light in another application. In this regard, the liquid medium, gas dissolved in the liquid medium, nanostructures in contact with the liquid medium, and/or other components of the optical limiter device may be selected or configured (e.g., arranged, positioned) to respond to light that is considered to be potentially harmful for a given application. As an example, for applications that may benefit from protection from laser pointers (e.g., driving a vehicle such as flying an aircraft vehicle), the frequency may include any frequency within the visible-light spectrum.

The threshold irradiance value may be an irradiance value determined to cause harm (e.g., temporarily or permanently blind eyes, damage and/or saturate sensors) for a given application. In an aspect, the threshold value for the irradiance is generally selected to be above an irradiance associated with the Sun, which may be around 0.1 W/cm$^2$. In this regard, the optical limiter device is configured such that, in general, light from the Sun and other sources of ambient light are allowed through the optical limiter device and to the aperture. For example, depending on application, the threshold irradiance may be selected to be around 0.1 W/cm$^2$, 0.15 W/cm$^2$, 0.2 W/cm$^2$, 0.5 W/cm$^2$, 1 W/cm$^2$, 5 W/cm$^2$, and all values in between. It is noted that light may have multiple frequency components, with each frequency component having an irradiance value. Different frequency components may be associated with different irradiance thresholds.

Using various embodiments, the optical limiter device may be configured to prevent light considered to be potentially harmful for a given application from reaching an aperture. The frequency range and the irradiance threshold value may be customized in the optical limiter device depending on application requirements, including customizing (e.g., selecting) properties of the liquid medium, gas, nanostructures, and/or windows, and/or arrangement of these components. For example, the nanostructures may rise in temperature in response to light having a frequency within a certain frequency range, whereas light of other frequencies do not cause the nanostructures to sufficiently respond.

In an embodiment, the optical limiter device provides high speed response to potentially harmful light, quick recovery from the potentially harmful light, and transparency for light that is not potentially harmful. For some applications, the optical limiter device may be designed with high sensitivity (e.g., especially to facilitate aperture protection for low irradiation levels) such that gas bubbles can form in response to light at low irradiance levels to scatter the light. In this regard, in these applications, light within a certain frequency range may be considered to be potentially harmful even at low irradiance levels (e.g., 0.2 W/cm$^2$). In some cases, the solution of the optical limiter device may respond to potentially harmful light by forming gas bubbles in less than a second of being illuminated by the light, and/or the solution may recover (e.g., the gas dissolves back into the liquid medium) in a few seconds of the light being removed.

Referring now to the drawings, FIG. 1 illustrates an optical limiter device 100 for facilitating aperture protection in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided.

The optical limiter device 100 includes windows 105 and 110 and a solution 115 between the windows 105 and 110. For example, the windows 105 and 110 may be made of glass. The solution 115 includes a liquid medium, nanostructures in contact with the liquid medium, and a gas dissolved in the liquid medium. In FIG. 1, the solution 115 includes nanostructures dispersed in (e.g., colloidally dispersed in) the liquid medium. As an example, a nanostructure 120 dispersed in the solution 115 is explicitly labeled in FIG. 1.

The solution 115 also includes nanostructures disposed on a surface of the window 105. In this regard, the nanostructures and the surface of the window 105 are in contact with the liquid medium. In FIG. 1, these nanostructures are disposed as a layer 130 of nanostructures on an inner surface (e.g., also referred to as inner side, bottom surface, or bottom side) of the window 105. The layer 130 of nanostructures may include nanoparticles attached to the inner surface of the window 105 and/or nanopatterns formed on the inner surface of the window 105 (e.g., using nanoimprint lithography and/or other techniques for creating plasmonic patterns). As an example, a nanostructure 135 disposed as part of the layer 130 in the solution 115 is explicitly labeled in FIG. 1. The nanostructure 135 may be a nanoparticle attached to the inner surface of the window 105 or a nanopattern (or portion thereof) formed on the inner surface of the window 105. In an aspect, a nanostructure may refer to a nanoparticle or nanopattern.

The optical limiter device 100 selectively prevents light from propagating through the optical limiter device 100 to an aperture 125 based on frequency components and associated irradiance values of the light. In an aspect, the optical limiter device 100 determines that light incident on the optical limiter device 100 is potentially harmful light when the light has a frequency component within a frequency range and an irradiance above a threshold value. For example, the light may have a frequency within the visible-light spectrum and an irradiance above a threshold irradiance of 0.1 W/cm$^2$. In FIG. 1, light 140 is not considered by the optical limiter device 100 to be potentially harmful, and thus the light 140 is passed through to the aperture 125. Although the light 140 is shown as parallel rays in FIG. 1, such a depiction is to simplify the figure. Portions of the light 140 may propagate through the optical limiter device 100 via the window 105, layer 130 of nanostructures, solution 115, and window 110, and to the aperture 125 from various angles. These rays of the light 140 are not depicted in FIG. 1 in order to avoid obscuring components of FIG. 1.

In an embodiment, as shown in FIG. 1, the optical limiter device 100 can be implemented (e.g., positioned) in front the aperture 125 to facilitate protection of the aperture 125. The aperture 125 may be, or may include, human eyes, an aperture of a sensor, and/or generally any opening that can receive electromagnetic (EM) radiation. EM radiation may generally refer to any radiation in the EM spectrum and may be referred to as an EM beam of radiation, EM beam, light, beam, or variant thereof (e.g., EM beam of light). The term light may include visible light, infrared light, ultraviolet light, or generally any portion of the EM spectrum. In some cases, the optical limiter device 100 may have a thickness (e.g., a distance from a top surface of the window 105 to a bottom surface of the window 110) around or less than a few millimeters.

By way of non-limiting example, the liquid medium may include water, alcohol, monoethanolamine (MEA), or combinations thereof. The gas that is dissolved in the liquid medium may include carbon dioxide ($CO_2$), ammonia ($NH_3$), or other gas. In some cases, the liquid medium is saturated with the gas. The liquid medium may also include a surfactant or foaming agent that aids in the generation of gas bubbles, such as sodium dodecyl sulfate, a protein (e.g., albumin), a combination of polypeptides, and/or others. When the liquid medium is raised in temperature from an original temperature, the gas may be released from the liquid medium (e.g., the gas comes out of solution) as gas bubbles. When the liquid medium reverts back to the original temperature, the gas may dissolve back into the liquid medium (e.g., the gas dissolves back in solution).

In an embodiment, each nanostructure (e.g., 120, 135) in contact with the liquid medium, including nanostructures dispersed in the solution 115 and/or disposed on the surface of the window 105 as part of the layer 130 of nanostructures, may support a resonance (e.g., a plasmon-polariton resonance) at a given frequency band (e.g., also referred to as a resonant frequency range) that is based on physical properties (e.g., material composition, size, shape) of the nanostructure and composition of the liquid medium. For example, the resonant frequency range of the nanostructure may depend on an index of refraction associated with the liquid medium. The resonance gives rise to absorption of incident light and conversion of the luminous incident energy to heat via phonon-electron interactions in the nanostructures.

When the nanostructures are illuminated by potentially harmful light (e.g., light having an irradiance above a threshold), the light excites collective surface charge oscillations (e.g., oscillations of free electron charges) at an interface between each nanostructure and the liquid medium. The oscillations of the nanostructures, in response to the incident light exceeding a given threshold value, give rise to absorption of the light by the nanostructures. In this regard, the nanostructures may absorb a portion of the light and re-radiate a remaining portion of the light. In some cases, absorbance of the light may be high, such as above 95% absorbance, whereas the re-radiation may be weak. For example, the nanostructures may have an absorbance of about 98% for light at infrared frequencies. The portion of the light that is absorbed by the nanostructure is transduced into heat that raises the temperature of the nanostructures and thus raises the temperature (e.g., via conduction and/or convection) of a portion of the liquid medium at the vicinity (e.g., immediate vicinity) of the nanostructures. The nanostructures may include plasmonic micro-absorbers, such as gold, silver, titanium nitride (TiN) nanoparticles, nanopatterns, and/or other nanostructures such as nanotubes (e.g., carbon nanotubes) or nanowires (e.g., silver nanowires, gold nanowires), that locally heat the liquid medium.

Since solubility of the gas in the liquid medium is temperature dependent, the increase in the temperature of the liquid medium in response to the heat from the nanostructures causes the solubility of the gas to decrease and the gas to release from the liquid medium (e.g., come out of solution) and form gas bubbles (e.g., also referred to as foam) around the nanostructures. In this manner, the incident light causes nanostructures along the light's path to rise in temperature and cause gas bubbles to be released from portions of the liquid medium local to these nanostructures due to the localized heating. For instance, the solubility of $CO_2$ in a liquid medium such as water or alcohol is strongly dependent on temperature such that even slight heating of nanostructures (e.g., increase in temperature of 1° C. to 2° C. in some cases) can cause release of some of the $CO_2$ locally, thus facilitating a fast response time (e.g., time from illumination of the nanostructures to creation of gas bubbles) of the optical limiter device 100 in response to the potentially harmful light. In some aspects, the solution 115 may include a surfactant (e.g., albumin and/or other foaming agent) mixed in the liquid medium to provide a structural matrix to facilitate stable bubble formation. For example, the surfactant may reduce surface tension in the liquid medium and allow gas bubbles to remain around the nanostructures.

The gas bubbles scatter the incident light such that the light does not reach the window 110, thus reducing transmission of the light through the optical limiter device 100 and preventing the light from traversing through the window 110 and reaching the aperture 125. At higher nanostructure density/concentration (e.g., number of nanostructures per unit volume or per surface area), less potentially harmful light can penetrate the solution 115. For example, when the aperture 125 includes human eyes, the gas bubbles prevent the light from traversing through the window 110 and potentially blinding (e.g., temporarily or permanently) the eyes. When the aperture 125 includes a sensor, the gas bubbles prevent the light from reaching the sensor and saturating and/or damaging the sensor.

In an aspect, since the light causes localized heating of the solution 115, the gas bubbles that are formed in portions of the optical limiter device 100 associated with the localized heating scatter the light, while other portions of the optical limiter device 100 allow light to pass through to the aperture 125. The light that is allowed through the aperture 125 have a frequency outside of the resonant frequency range(s) collectively provided by the nanostructures in contact with the solution 115 (e.g., including the nanostructures dispersed in the solution 115 and the nanostructures in the layer 130 of nanostructures), and/or have irradiance less than threshold, and is generally considered to not be harmful for a given application.

The gas bubbles remain in the optical limiter device 100 until illumination of the light ends. Once the illumination ends, the temperature of the nanostructures can revert back to their original temperature (e.g., back to their temperature when no potentially harmful light is incident) and the gas can dissolve back into the liquid medium. In this regard, once the nanostructures revert back to their original temperature, the solubility of the gas increases in response to the temperature decrease and the gas is dissolved back into the liquid medium. In an aspect, the dissolving of the gas back into the liquid medium may be referred to as recovery of the optical limiter device 100. In this regard, the gas bubbles may be considered as transient scattering centers in the solution 115 that are induced by the incident light and disappear once the incident light is removed.

As such, operation of the optical limiter device 100 to create gas bubbles in response to potentially harmful light is reversible. In some cases, the gas bubbles may form in response to potentially harmful light in less than a second of the light illuminating the associated nanostructures, and the gas may dissolve back into the liquid medium in a few seconds upon removal of the potentially harmful light. In an aspect, hermetically sealing the windows 105 and 110 to each other may help keep vapor pressure and liquid/gas equilibrium constant and facilitate this reversible process. In some cases, the hermetic sealing prevents the gas and the liquid medium from being exhausted during this reversible process.

In an embodiment, nanostructures of different material composition, sizes, and/or shapes may be provided in contact with the solution 115 (e.g., including the nanostructures dispersed in the liquid medium and/or in the layer 130 of nanostructures on the inner surface of the window 105) such that the nanostructures collectively provide resonances across wide and/or different frequency range(s). In some cases, a resonant frequency range may encompass the visible-light spectrum (e.g., such as to protect from visible-light laser pointers), infrared spectrum, and/or other EM spectrum. The nanostructures may be cubic, spherical, rod-shaped, plate-shaped, and/or other shapes. As an example, a spherical or plate-shaped nanostructure may be around 10 nm to 100 nm in diameter.

In some aspects, the nanostructures may include electrically conductive material. The nanostructures may include metal nanostructures. By way of non-limiting example, the metal nanostructures may include gold, silver, other noble metals, aluminum, copper, and/or other metals. In some cases, they may include carbon nanotubes or TiN materials. In some cases, the nanostructures may be functionalized. In an aspect, the nanostructures may include nanoshells, which include a dielectric core covered by a metallic shell. For example, the nanoshells may include a silica core and a gold shell. In some cases, nanoshells have a better scattering efficiency than nanoparticles without a core-shell structure. Similarly, in an aspect, the nanostructures may include nanopatterns having metal/dielectric layers that can form various plasmonic resonators.

In one example, gold and/or silver nanostructures of various shapes and/or sizes may be provided in contact with the liquid medium to oscillate in response to incident visible light. Alternatively and/or in addition, aluminum, copper, and/or TiN nanostructures of various shapes and/or sizes may be provided in contact with the liquid medium to oscillate in response to incident infrared light. Nanostructures used to oscillate in response to infrared light may generally be larger than nanostructures used to oscillate in response to visible light, since infrared light has a longer wavelength than visible light.

Although FIG. 1 illustrates an example of an optical limiter device that includes nanostructures (e.g., 120) dispersed in the liquid medium as well as nanostructures (e.g., 135) disposed on a surface of the window 105, the optical limiter device 100 may include a different arrangement of nanostructures in contact with the solution 115 than that shown in FIG. 1. In an aspect, the optical limiter device 100 may include the nanostructures dispersed in the liquid medium and not the nanostructures disposed on a surface of the window 105. In another aspect, the optical limiter device 100 may include the layer 130 of nanostructures disposed on a surface of the window 105 and not the nanostructures dispersed in the liquid medium. Alternatively and/or in addition to the various arrangements described in the foregoing, other arrangements of the nanostructures in the optical limiter device 100 may be utilized, such as nanostructures disposed on a surface (e.g., top surface) of the window 110 for example, for facilitating protection of the aperture 125.

Figure 2A:
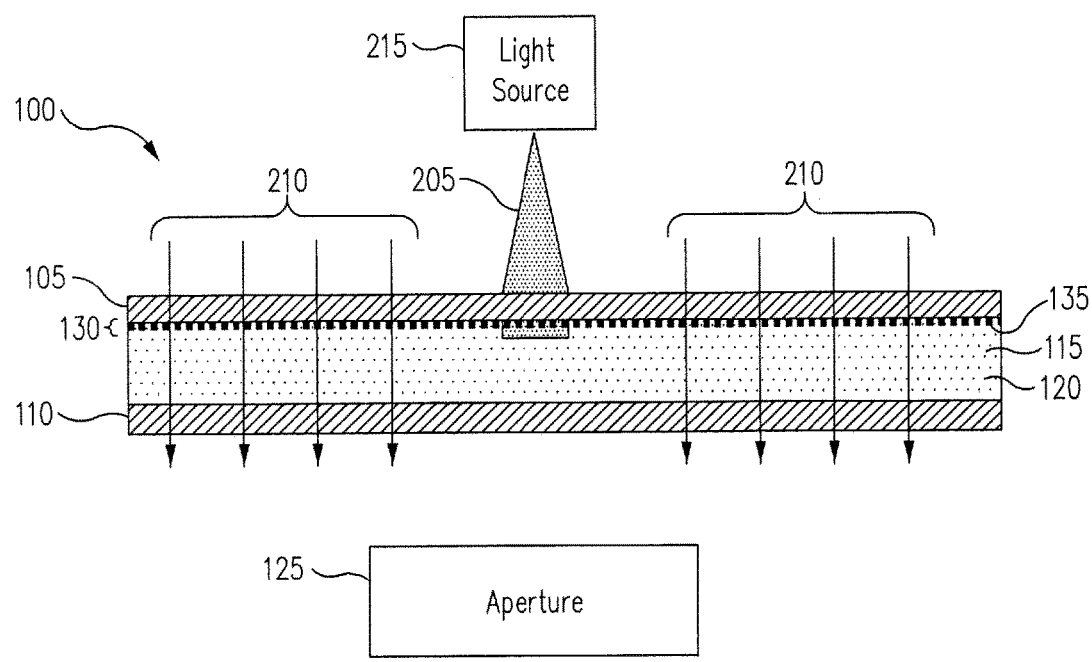
FIG. 2A illustrates light incident on a solution of an optical limiter device in accordance with one or more embodiments of the present disclosure.
Figure 2B:
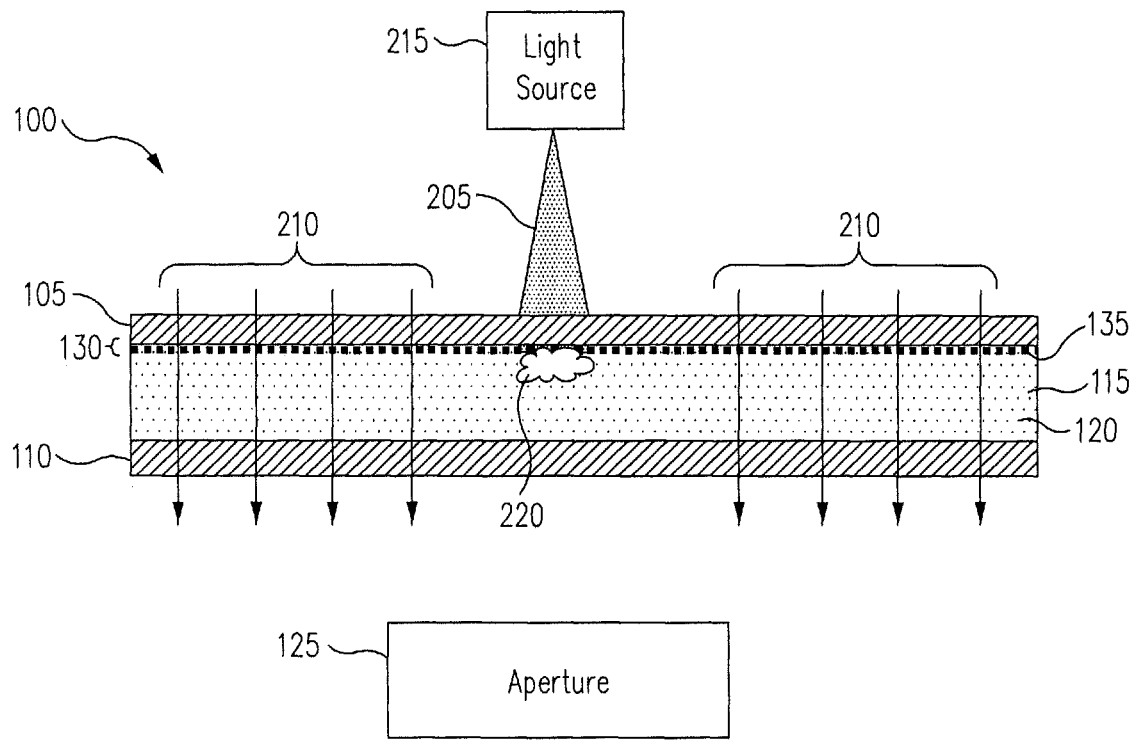
FIG. 2B illustrates gas bubbles forming in the solution in response to incident light in accordance with one or more embodiments of the present disclosure.

FIG. 2A illustrates light 205 and 210 incident on the nanostructures (e.g., 120, 135) in contact with the solution 115 of the optical limiter device 100 in accordance with one or more embodiments of the present disclosure. FIG. 2B illustrates gas bubbles forming in response to the light 205 in accordance with one or more embodiments of the present disclosure. In this regard, the gas bubbles form in response to the light 205 being incident on the nanostructures disposed on the window 105, which create gas bubbles at or near an interface of the window 105 and the liquid medium, and the nanostructures disposed in the solution 115. In FIGS. 2A and 2B, the light 210 may propagate through the optical limiter device 100 to reach the aperture 125, whereas the light 205 is prevented from reaching the aperture 125 by gas bubbles 220 formed in response to the light 205.

In some aspects, the light 205 may have a frequency within a resonant frequency range associated with the nanostructures (e.g., 120, 135) in contact with the liquid medium and an irradiance at or above a threshold value (e.g., 0.1 W/cm$^2$). By contrast, the light 210 may have a frequency outside of the resonant frequency range associated with the nanostructures in contact with the liquid medium and/or an irradiance below the threshold value, and are thus allowed to propagate through the optical limiter device 100. In this regard, the light 205 is considered to be potentially harmful light whereas the light 210 is considered to not be harmful. The light 205 may be from a light source 215, such as a laser pointer or laser dazzler. The light 210 may include ambient light, such as from the Sun, and/or any stray light.

In FIG. 2B, nanostructures in contact with a portion of the liquid medium illuminated by the light 205 generate gas bubbles 220. In some cases, such as shown in FIG. 2B, the layer 130 of nanostructures on the window 105 essentially provide a surface area with a high concentration of nanostructures such that the solution 115 responds to the light 205 and the forms gas bubbles 220 at or near an interface of the window 105 (e.g., an inner surface of the window 105) and the liquid medium. In this regard, as the light 210 propagates through the layer 130 of nanostructures and the solution 115, the nanostructures along the path of the light 210 may absorb the light 210 and transduce the absorbed light into heat (e.g., conduction and/or convention heat) that raises the temperature of the solution 115 local to these nanostructures. The gas that is dissolved in the liquid medium comes out of the solution 115 in response to the raised temperature in the form of the gas bubbles 220.

The gas bubbles 220 cause a portion of the optical limiter device 100 to be opaque, in that the light 205 is scattered by the gas bubbles 220 and prevented from reaching the window 110. In some cases, when the light 205 is present, any additional light (e.g., ambient light) that propagates into the optical limiter device 100 and impinges on the gas bubbles 220 may also be scattered by the gas bubbles 220, even when the nanostructures normally allow such light to pass through (e.g., the light is not potentially harmful light). A remaining portion of the optical limiter device 100 may allow the light 210 (and other incident light) to pass through the optical limiter device 100 even when the gas bubbles 220 are present, thus allowing the aperture 125 to receive the light 210 via the optical limiter device 100 while protecting the aperture 125 from the light 205. For example, when the aperture 125 includes a pilot's eyes, the pilot can see through portions of the optical limiter device 100 not blocked by the gas bubbles 220.

Gas bubbles in addition to the gas bubbles 220 may be formed as the light 205 propagates through the solution 115. In this regard, any remaining portion of the light 205 that is not scattered by the gas bubbles 220 may be scattered by subsequent gas bubbles formed by the remaining portion as the remaining portion propagates through the solution 115 (e.g., as the remaining portion of the light 205 propagates toward the window 110). At higher nanostructure density/ concentration (e.g., number of nanostructures per unit volume or per surface area), less of the light can penetrate the nanostructures throughout the solution 115 to reach the window 110 and subsequently the aperture 125.

Figure 2C:
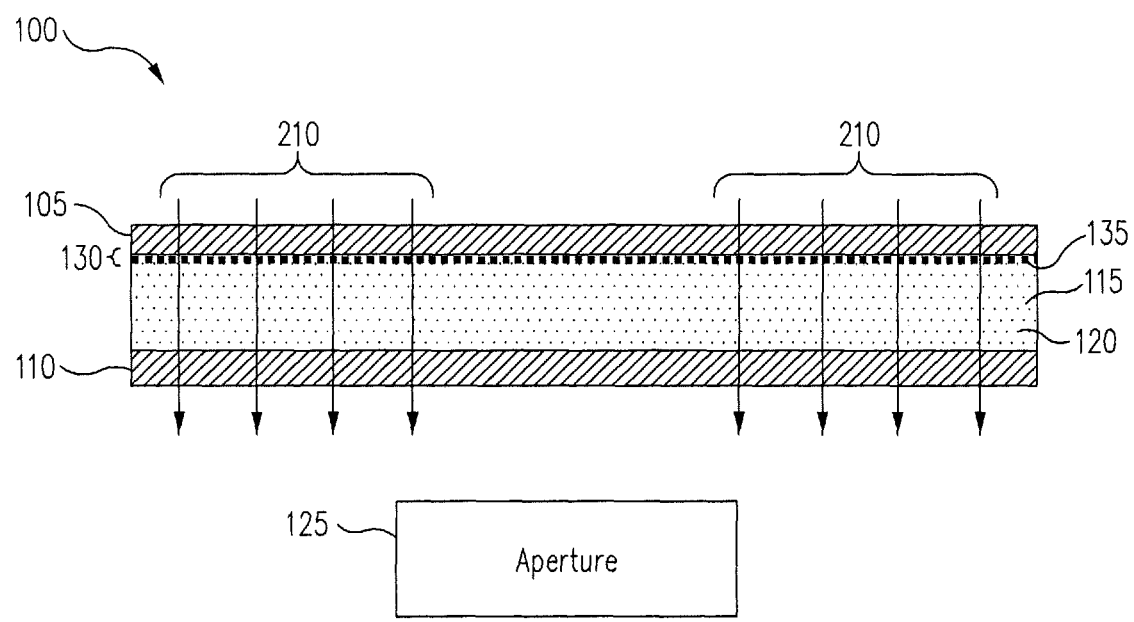
FIG. 2C illustrates the gas bubbles having dissolved back into the solution once incident light is removed.

FIG. 2C illustrates the gas bubbles 220 having dissolved back into the solution 115 once the light 205 is removed. For example, the light 205 may be removed when the light source 215 is turned off. In some cases, the windows 105 and 110 are hermetically sealed to each other, such that little to no portion of the gas and/or liquid medium is exhausted due to reactions of the solution 115 in response to the light 205.

Figure 2D:
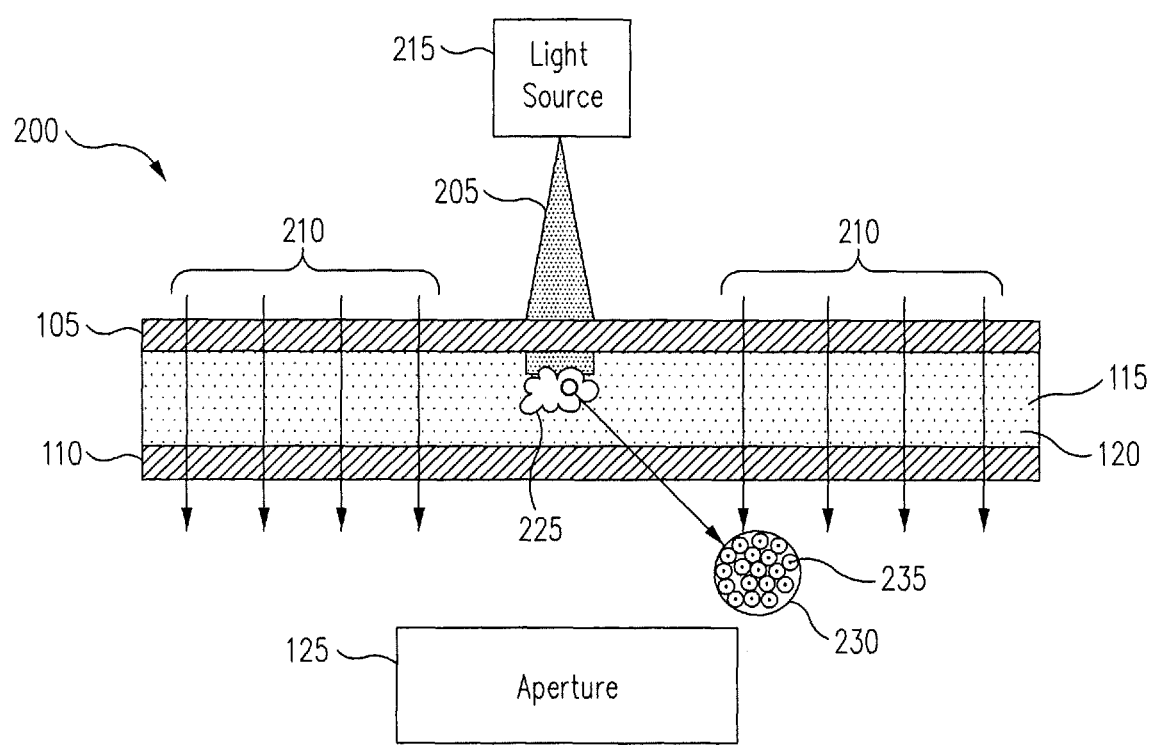
FIG. 2D illustrates light incident on a solution of an optical limiter device in accordance with one or more embodiments of the present disclosure.

FIG. 2D illustrates the light 205 and 210 incident on nanostructures of an optical limiter device 200 in accordance with one or more embodiments of the present disclosure. The description of the optical limiter device 100 of FIG. 1 and operation thereof as provided in FIGS. 2A-2C generally applies to the optical limiter device 200 of FIG. 2D, with examples of differences and other description provided herein. The optical limiter device 200 includes the windows 105 and 110 and the solution 115 with nanostructures (e.g., 120) dispersed in the liquid medium, but without a layer of nanostructures formed on a surface of the window 105 (e.g., nanopatterns formed in the surface of the window 105 and/or nanoparticles attached to the surface of the window 105). The nanostructures in a portion of the solution 115 illuminated by the light 205 generate gas bubbles 225. For example, an example gas bubble 230 is formed locally around the nanostructures (e.g., nanostructure 235) that absorb the light 205 is shown in FIG. 2D. The gas bubbles 225 dissolve back into the solution 115 once the light 205 is removed, similar to that shown in FIG. 2C.

Figure 3:
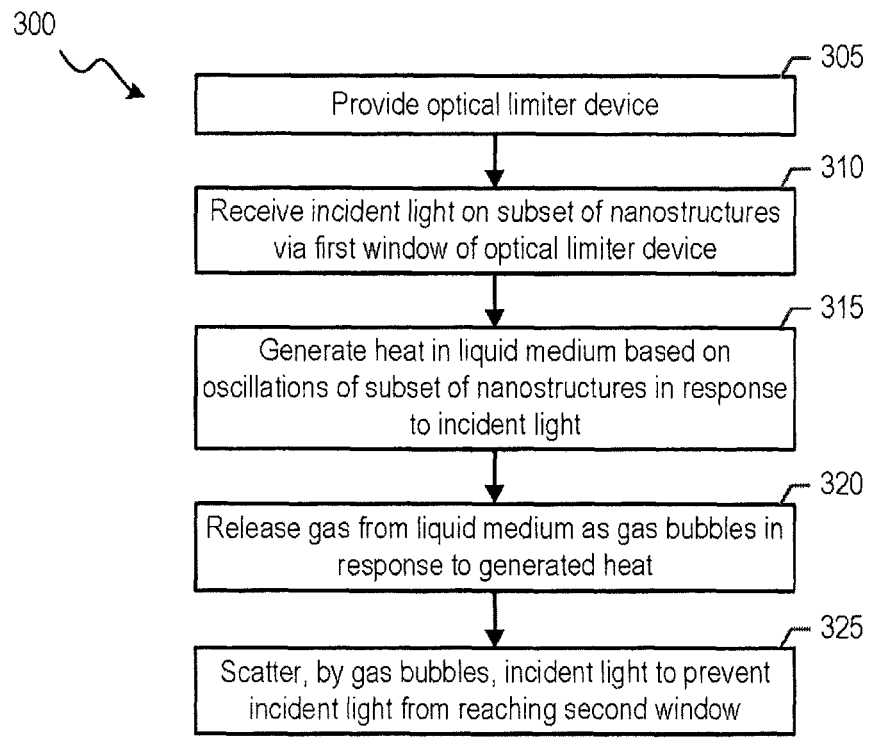
FIG. 3 illustrates a flow diagram of an example process for facilitating aperture protection in accordance with one or more embodiments of the present disclosure.

Although light (e.g., 205, 210) incident on the optical limiter devices 100 and 200 is discussed above as having a single frequency component, the light incident on the optical limiter device 100 may have multiple frequency components, with each frequency component having an irradiance value. In this case, the nanostructures in contact with the solution 115 may rise in temperature and generate gas bubbles in response to the frequency components of the incident light that coincide with one or more resonant frequencies of the nanostructures and have an irradiance above a respective threshold. In some cases, different frequencies may be associated with different irradiance thresholds. The nanostructures allow frequency components of the incident light outside the resonant frequency or frequencies encompassed by the nanostructures and/or below the irradiance threshold to pass to the aperture 125. FIG. 3 illustrates a flow diagram of an example process 300 for facilitating aperture protection in accordance with one or more embodiments of the present disclosure. For explanatory purposes, the example process 300 is described herein primarily with reference to the optical limiter device 100 of FIGS. 1 and 2A-2C; however, the example process 300 is not limited to the example optical limiter device 100 of FIGS. 1 and 2A-2C. For example, the example process 300 may be utilized with the optical limiter device 200 of FIG. 2D, or other optical limiter device. Note that one or more operations may be combined, omitted, and/or performed in a different order as desired.

At block 305, the optical limiter device 100 is provided as part of a system. The system may be, may include, or may be a part of, a vehicle (e.g., terrestrial, naval, aerial, and/or space vehicles), a sensor (e.g., radar sensor), wearable device (e.g., glasses, goggle), and/or generally in any system in which aperture protection may be implemented. An example of a system is described with respect to FIG. 5.

At block 310, incident light (e.g., 205) is received through the window 105 and by nanostructures in contact with the liquid medium. As an example, with reference to FIG. 2B, the incident light 205 is received by the nanostructures disposed on the window 105 and/or in the liquid medium. As another example, with reference to FIG. 2D, the incident light 205 is received by the nanostructures in the liquid medium. The incident light has a frequency within the resonant frequency range collectively provided by the nanostructures and an irradiance above a threshold value. At block 315, heat is generated in the liquid medium of the solution 115 due to oscillations of the nanostructures in response to the incident light. In this regard, the nanostructures may absorb the incident light and transduce the incident light into heat that raises the temperature of the nanostructures. The nanostructures transfer the heat (e.g., via conduction and/or convention) to the liquid medium to raise the temperature of the liquid medium. At block 320, a portion of the gas dissolved in the liquid medium is released as gas bubbles (e.g., 220) from the solution 115 in response to the generated heat. In some cases, the gas may be released due at least in part to a decrease in solubility of the gas in the liquid medium in response to the generated heat. At block 325, the gas bubbles scatter the incident light to prevent the incident light from reaching the window 110. Thus, the optical limiter device 100 prevents the incident light from reaching the aperture 125. In some cases, when the incident light is removed, the gas bubbles dissolve back in the liquid medium.

Figure 4:
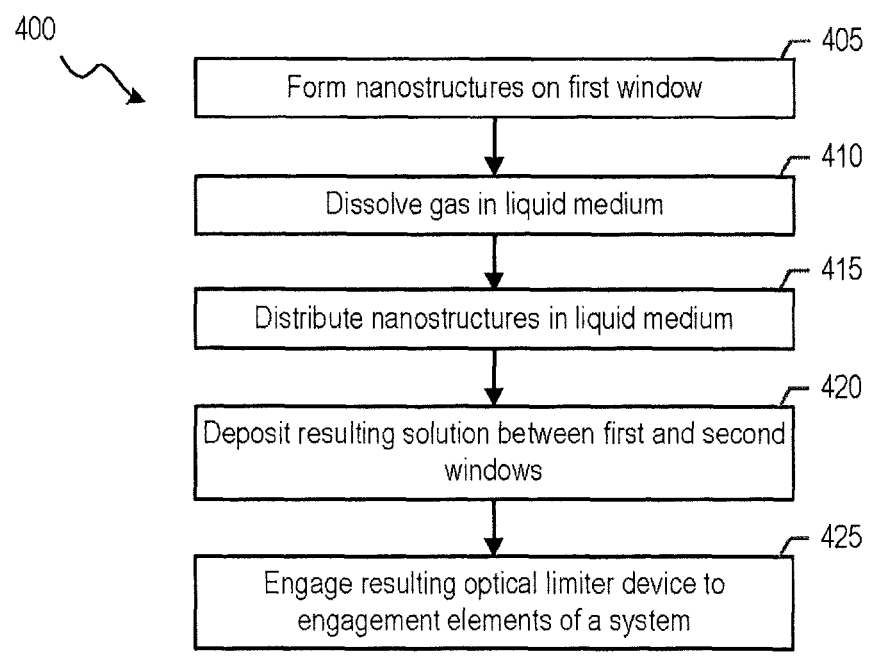
FIG. 4 illustrates a flow diagram of an example process for making a system for facilitating aperture protection in accordance with one or more embodiments of the present disclosure.

FIG. 4 illustrates a flow diagram of an example process 400 for making a system for facilitating aperture protection in accordance with one or more embodiments of the present disclosure. For explanatory purposes, the example process 400 is described herein with reference to the optical limiter device 100 of FIGS. 1 and 2A-2C; however, the example process 400 is not limited to the example optical limiter device 100 of FIGS. 1 and 2A-2C. In an aspect, the example process 400 may be implemented at block 305 of the example process 300 of FIG. 3. Note that one or more operations may be combined, omitted, and/or performed in a different order as desired.

At block 405, nanostructures are disposed on a surface (e.g., inner surface) of the window 105 that is to be in contact with the liquid medium. For example, the nanostructures may include nanoparticles attached to the inner surface of the window 105 and/or nanopatterns formed on the inner surface of the window 105. At block 410, a gas is dissolved in a liquid medium. At block 415, nanostructures are distributed in the liquid medium. The nanostructures may be distributed in the liquid medium after the gas is dissolved in the liquid medium. In some cases, a surfactant may be mixed into the liquid medium before, after, or while the gas is dissolved in the liquid medium and/or the nanostructures are distributed in the liquid medium.

At block 420, a resulting solution (e.g., the liquid medium with the gas dissolved therein and the nanostructures dispersed therein) is deposited between the windows 105 and 110. The solution 115 is formed of the liquid medium, gas dissolved in the liquid medium, and nanostructures in contact with the liquid medium. The nanostructures include nanostructures distributed in the liquid medium and nanostructures disposed on the surface of the window 105. In some cases, subsequent to forming the solution 115, the windows 105 and 110 are hermetically sealed to each other. At block 425, the windows 105 and 110 are engaged with one or more engagement elements of the system. The optical limiter device 100 may provide a window structure to engage with these engagement elements. The engagement elements may include adhesives, nails, magnets, suction cups, bumps and ridges, and/or generally any fasteners and/or fastening structure that can support the optical limiter device 100 and/or couple the optical limiter device 100 to a component of the system, such as a housing of the system. In an embodiment, block 405 or 415 is not performed. For example, a system that includes the optical limiter device 200 of FIG. 2D may be made by performing blocks 410, 415, 420, and 425 (e.g., without performing block 405).

Figure 5:
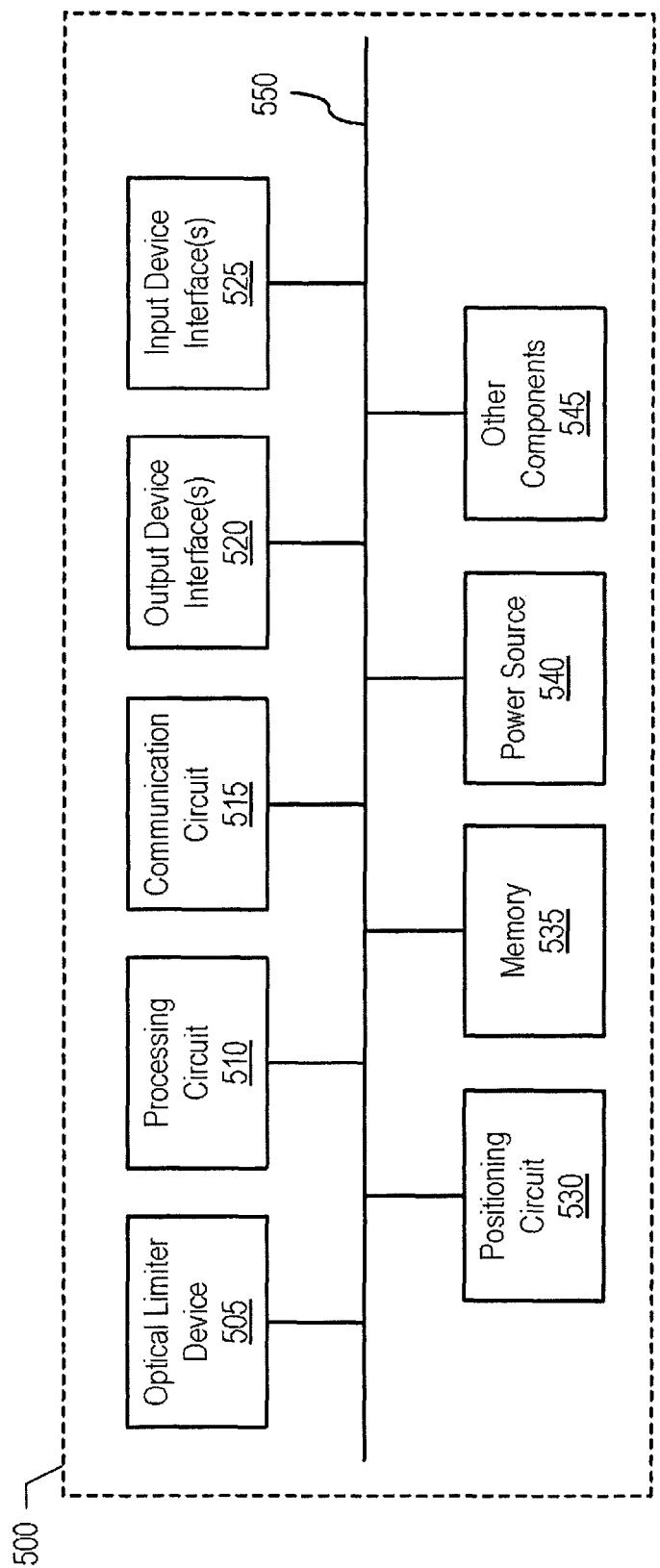
FIG. 5 illustrates a system with an optical limiter device for facilitating aperture protection in accordance with one or more embodiments of the present disclosure.

FIG. 5 illustrates a system 500 with an optical limiter device 505 for facilitating aperture protection in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 500 may be utilized in terrestrial, naval, aerial, and/or space applications with appropriate selection and configuration of components (e.g., operating frequencies, material composition, etc.). The system 500 may be, may include, or may be a part of a vehicle (e.g., automobile vehicle, aircraft vehicle, satellite), a sensor, a wearable device (e.g., glasses, goggles), or generally in any system in which aperture protection may be implemented. In an aspect, the dashed line in FIG. 5 may represent a housing of the system 500.

The system 500 includes an optical limiter device 505, a processing circuit 510, a communication circuit 515, one or more output device interfaces 520, one or more input device interfaces 525, a positioning circuit 530, a memory 535, a power source 540, other components 545, and a bus 550. The optical limiter device 505 may be utilized to prevent potentially harmful light from reaching apertures associated with the system 500. For example, when the system 500 is an aircraft vehicle, the apertures may include eyes of humans aboard the aircraft vehicle (e.g., passengers, pilot, etc.) and sensor equipment. In some cases, the optical limiter device 505 may be provided as a window of the system 500. In an embodiment, the optical limiter device 505 may be, may include, or may be a part of, the optical limiter device 100 or the optical limiter device 200. As indicated above, depending on the system 500, the system 500 may include additional components, different components, and/or fewer components than those shown in FIG. 5. For example, when the system 500 is implemented in a pair of glasses, the system 500 may include the optical limiter device 505 provided as each glass lens or in front of each glass lens (e.g., without many of the components shown in FIG. 5).

The processing circuit 510 may execute machine readable instructions (e.g., software, firmware, or other instructions) stored in the memory 535. In this regard, the processing circuit 510 may perform any of various operations, processes, and techniques to facilitate operation of the system 500. For example, in an aircraft vehicle, the processing circuit 510 may facilitate operation of the aircraft vehicle, including flight of the aircraft vehicles and any mission-specific processes of the aircraft vehicles (e.g., radar applications, imaging applications, etc.). The processing circuit 510 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices. In an embodiment, in response to potentially harmful light, the processing circuit 510 may generate and transmit control signals to other components within the system 500 and/or other systems, such as to mitigate any damage caused by the light (e.g., turn on backup sensor equipment to replace sensor equipment damaged by the light), discover a source of the light, and/or remove the source of the light.

The communication circuit 515 may be configured to handle, manage, or otherwise facilitate wired and/or wireless communication between various components of the system 500 and between the system 500 and another system. In an embodiment, the communication circuit 515 may include a wireless communication circuit (e.g., based on the IEEE 802.11 standard, Bluetooth™ standard, ZigBee™ standard, or other wireless communication standard), cellular circuit, or other appropriate communication circuit. In some cases, the communication circuit 515 may be configured for a proprietary wireless communication protocol and interface. The communication circuit 515 may include, or may be in communication with, an antenna for wireless communication. Thus, in one embodiment, the communication circuit 515 may handle, manage, or otherwise facilitate wireless communication by establishing a wireless link to a handheld device, base station, wireless router, hub, or other wireless networking device.

The communication circuit 515 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 515 may support proprietary wired communication protocols and interfaces. The communication circuit 515 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The output device interface(s) 520 may couple the system 500 to one or more output devices. The output device interface(s) 520 may include a graphics and/or audio driver card, graphics and/or audio driver chip, and/or graphics and/or audio driver processor. The output device(s) may enable the system 500 to provide output information to a user. For example, the output device(s) may include one or more display devices. The display device(s) may be utilized to display information to a user. For example, in response to potentially harmful light being incident on the optical limiter device 505, the display device(s) may provide information associated with the potentially harmful light. The information may include a potential position of an associated light source, images associated with a surrounding area (e.g., to facilitate detection and/or identification of additional threats), instructions for responding to the potentially harmful light and/or other threat, and/or prompts for requesting input from the user (e.g., prompt requesting the user to approve sounding an alarm). The display device(s) may include a flat screen display, a touch screen display, a light emitting diode (LED), or generally any device that may convey information visually.

The input device interface(s) 525 may couple the system 500 to one or more input devices. The input device(s) may enable the user to provide (e.g., enter) data and commands to the system 500. The input device(s) may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the system 500. In this regard, the user input may be received in any form, such as audio (e.g., speech), visual, and/or tactile. In some cases, the input device(s) may be integrated with and may also be a part of a display, such as in a touch screen display.

The positioning circuit 530 may be utilized to monitor a position of the system 500. The positioning circuit 530 may include, or may be in communication with (e.g., via the communication circuit 515), a global positioning system (GPS) that provides the position of the system 500.

The memory 535 may be utilized to store information for facilitating operation of system 500. By way of non-limiting example, the memory 535 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 535 may include volatile memory, such as random-access memory (RAM), dynamic RAM (DRAM), static RAM (SRAM), etc. The memory 535 may store information such as instructions to be executed by the various components (e.g., the processing circuit 510) of the system 500, buffered information to be transmitted (e.g., by the communication circuit 515), and/or other information. In some cases, the memory 535 may store information such as instructions to be executed in response to potentially harmful light.

The power source 540 may supply power to operate the system 500, such as by supplying power the various components of the system 500. The power source 540 may be, or may include, one or more batteries (e.g., rechargeable batteries, non-rechargeable batteries). Alternatively or in addition, the power source 540 may be, or may include, one or more solar cells. The solar cells may be utilized to supply power to operate the system 500 and/or to charge one or more rechargeable batteries.

In addition, the system 500 may include other components 545. By way of non-limiting example, the other components 545 may be used to implement any features of the system 500 as may be desired for various applications (e.g., radar imaging applications, surveillance applications, delivery applications, construction applications, etc.). The bus 550 may be utilized to facilitate communication of data between the various components of the system 500.

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims and their equivalents.

What is claimed is:

1. A method comprising:
   receiving, via a first window, incident light on a solution, wherein the solution comprises a liquid medium, a gas dissolved in the liquid medium, a foaming agent mixed in the liquid medium, and a plurality of nanostructures in contact with the liquid medium, wherein the solution is between the first window and a second window hermetically sealed to the first window, and wherein at least one of the plurality of nanostructures comprises a shell and a core covered by the shell;
   generating heat in the liquid medium based on oscillations of a subset of the plurality of nanostructures in response to the incident light;
   releasing at least a portion of the gas from the solution as gas bubbles in response to the generated heat; and
   scattering, by the released gas bubbles, the incident light to prevent the incident light from reaching the second window.

2. The method of claim 1, wherein the plurality of nanostructures comprises nanostructures distributed in the liquid medium and/or on a surface of the first window in contact with the liquid medium.

3. The method of claim 1, wherein the generating comprises heating at least a portion of the liquid medium from a first temperature to a second temperature, the method further comprising dissolving the released gas back into the liquid medium as the portion of the liquid medium decreases from the second temperature toward the first temperature.

4. The method of claim 1, wherein the heat is generated in response to the incident light when the incident light has a frequency within a frequency range and has at least a threshold irradiance.

5. The method of claim 4, wherein the frequency range and threshold irradiance are based at least in part on a size and a shape of each of the plurality of nanostructures, wherein the frequency range encompasses a visible-light spectrum and/or an infrared spectrum, and wherein the threshold irradiance is 0.1 W/cm$^2$.

6. A system comprising:
   an optical device comprising:
   a first window configured to pass incident light;
   a second window hermetically sealed to the first window;
   a solution between the first window and the second window, wherein the solution comprises:
   a liquid medium;
   a plurality of nanostructures in contact with the liquid medium, wherein at least a subset of the plurality of nanostructures is configured to generate heat by oscillating in response to the incident light when the incident light has a frequency within a frequency range and has at least a threshold irradiance, and wherein the threshold irradiance is 0.1 W/cm$^2$;
   a foaming agent mixed in the liquid medium; and
   a gas dissolved in the liquid medium, wherein at least a portion of the gas is configured to release from the liquid medium as gas bubbles in response to the generated heat, and wherein the released gas bubbles are configured to scatter the incident light to prevent the incident light from reaching the second window.

7. The system of claim 6, wherein the plurality of nanostructures comprises nanostructures distributed in the liquid medium and/or on a surface of the first window.

8. The system of claim 6, wherein the plurality of nanostructures comprises a plurality of nanopatterns on a surface of the first window configured to generate heat by oscillating in response to the incident light.

9. The system of claim 6, wherein the subset of the plurality of nanostructures is configured to heat at least a portion of the liquid medium from a first temperature to a second temperature via oscillations, and wherein the released gas is configured to dissolve in the liquid medium as the portion of the liquid medium decreases from the second temperature toward the first temperature.

10. The system of claim 6, wherein the frequency range encompasses a visible-light spectrum and/or an infrared spectrum.

11. The system of claim 6, wherein the first and second windows are transparent at least to visible wavelengths, and wherein the plurality of nanostructures comprises electrically conductive material.

12. The system of claim 11, wherein the plurality of nanostructures comprises a plurality of metal nanostructures, carbon nanotubes, or titanium nitride.

13. The system of claim 6, wherein the system is a vehicle, a sensor, or a wearable device, wherein the released gas is configured to scatter the incident light to prevent the incident light from reaching the second window to provide protection to one or more operators of the system and/or one or more components of the system.

14. The system of claim 13, wherein:
the system is an aircraft vehicle;
the system further comprises:
a housing; and
one or more engagement elements coupled to the housing and configured to receive the optical device; and
the optical device provides a window structure configured to engage with the one or more engagement elements and selectively pass light into the aircraft vehicle.

15. A method of making the system of claim 6, the method comprising:
forming the solution, wherein the forming comprises:
dissolving the gas in the liquid medium;
mixing the foaming agent in the liquid medium; and
providing the plurality of nanostructures in contact with the liquid medium;
providing the solution between the first and second window;
hermetically sealing the first window to the second window; and
engaging the first window and second window with one or more engagement elements configured to receive the optical device.

16. The method of claim 15, wherein the plurality of nanostructures comprises nanostructures distributed in the liquid medium and/or nanostructures formed on an inner surface of the first window.

17. The system of claim 6, wherein the gas comprises carbon dioxide or ammonia, and wherein the foaming agent comprises at least one of sodium dodecyl sulfate, a protein, or polypeptides.

18. The system of claim 6, wherein at least one of the plurality of nanostructures comprises a shell and a core covered by the shell.

19. An aircraft vehicle comprising:
an optical device comprising:
a first window configured to pass incident light;
a second window hermetically sealed to the first window;
a solution between the first window and the second window, wherein the solution comprises:
a liquid medium;
a plurality of nanostructures in contact with the liquid medium, wherein at least a subset of the plurality of nanostructures is configured to generate heat by oscillating in response to the incident light, and wherein at least one of the plurality of nanostructures comprises a shell and a core covered by the shell; and
a gas dissolved in the liquid medium, wherein at least a portion of the gas is configured to release from the liquid medium as gas bubbles in response to the generated heat, and wherein the released gas bubbles are configured to scatter the incident light to prevent the incident light from reaching the second window;
a housing; and
one or more engagement elements coupled to the housing and configured to receive the optical device, wherein the optical device provides a window structure configured to engage with the one or more engagement elements and selectively pass light into the aircraft vehicle.

20. The aircraft vehicle of claim 19, wherein the subset of the plurality of nanostructures is configured to generate the heat by oscillating in response to the incident light when the incident light has a frequency within a frequency range and has at least a threshold irradiance, wherein the frequency range encompasses a visible-light spectrum and/or an infrared spectrum, and wherein the threshold irradiance is 0.1 W/cm$^2$.

* * * * *